United States Patent
Bai et al.

(10) Patent No.: US 9,729,632 B2
(45) Date of Patent: Aug. 8, 2017

(54) MANAGING MIGRATION OF AN APPLICATION FROM A SOURCE TO A TARGET

(71) Applicant: International Business Machines Corporation, Armonk, NY (US)

(72) Inventors: Kun Bai, Elmsford, NY (US); Jinho Hwang, Ossining, NY (US); Brian Peterson, Ridgefield, CT (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/517,144

(22) Filed: Oct. 17, 2014

(65) Prior Publication Data

US 2016/0112510 A1    Apr. 21, 2016

(51) Int. Cl.
*G06F 15/16*     (2006.01)
*H04L 29/08*    (2006.01)
*G06F 9/455*    (2006.01)

(52) U.S. Cl.
CPC ...... *H04L 67/1095* (2013.01); *G06F 9/45558* (2013.01); *G06F 2009/4557* (2013.01)

(58) Field of Classification Search
CPC ....... G06F 2009/45595; G06F 9/45558; H04L 67/1095
See application file for complete search history.

(56) References Cited

U.S. PATENT DOCUMENTS

| 8,316,125 | B2 | 11/2012 | DeHaan |
| 8,601,483 | B2 | 12/2013 | He et al. |
| 2010/0281072 | A1* | 11/2010 | Cicman ............. G06F 17/30914 707/803 |
| 2012/0054731 | A1 | 3/2012 | Aravamudan et al. |
| 2012/0072903 | A1 | 3/2012 | Joukov et al. |
| 2012/0204149 | A1* | 8/2012 | Joukov ............... G06F 11/3051 717/121 |
| 2012/0317573 | A1 | 12/2012 | Osogami et al. |
| 2013/0262390 | A1 | 10/2013 | Kumarasamy et al. |
| 2014/0278808 | A1* | 9/2014 | Iyoob ................. G06Q 30/0206 705/7.35 |
| 2014/0279201 | A1* | 9/2014 | Iyoob ................. G06Q 30/0631 705/26.7 |

(Continued)

OTHER PUBLICATIONS

Mell, P., et al., "The NIST Definition of Cloud Computing," Recommendations of the National Institute of Standards and Technology. NIST Special Publication 800-145, Sep. 2011. 7 pages.

*Primary Examiner* — Mohamed Wasel
(74) *Attorney, Agent, or Firm* — Robert J. Shatto

(57) ABSTRACT

Aspects of the disclosure relate to managing migration of an application. The managing migration of an application includes establishing a source dataset. The source dataset includes a set of source features. The source features relate to a source. The source includes the application. A determination of a first set of migration plans is made. The determination is made with an evaluation. The evaluation is made using the source dataset and a set of legacy features. The evaluation is performed with a cost measure. The application is migrated from the source to the target. The migration is based on the determined first set of migration plans.

18 Claims, 6 Drawing Sheets

(56) References Cited

U.S. PATENT DOCUMENTS

2015/0316996 A1* 11/2015 Dal Mutto .......... G06F 3/04815
  345/156
2016/0036655 A1* 2/2016 Burton ................ H04L 41/5029
  709/223

* cited by examiner

MANAGING MIGRATION OF AN APPLICATION FROM A SOURCE TO A TARGET

BACKGROUND

The present disclosure relates to computer systems, and more specifically, to managing a migration of an application from a source to a target.

In modern network systems, applications are hosted on a set of computer systems and accessed on a set of networks provided by the set of computer systems. Occasions exist where the set of computer systems or the set of networks may change from a first location to a second location. If the set of computer systems or the set of networks change, an application may be migrated from the first location to the second location. Different methods for migrating the application can be used.

SUMMARY

Aspects of the disclosure relate to managing migration of an application from a source to a target. Aspects of the disclosure include establishing a source dataset. The source dataset includes a set of source features. The source features relate to a source. The source includes the application. A determination of a first set of migration plans is made. The determination is made using an evaluation. The evaluation is made using the source dataset and a set of legacy features. The evaluation is performed with a cost measure. The application is migrated from the source to the target. The migration is based on the determined first set of migration plans.

Aspects of the disclosure may include a learning process. The learning process may improve the migration plan determination through migrations. Aspects of the disclosure may include a comparison of the source dataset to the set of legacy features. The set of legacy features may include source datasets of previously migrated applications. The comparison may determine the set of migration plans. Embodiments may include the determination of the set of migration plans employing a cost measure. Aspects of the disclosure may include a stability test of the migration. The stability test may include numerous probabilistic extrapolations of the application onto the target per the migration plan. Alternatively, in an embodiment the user may guide aspects of the disclosure to create a new migration plan. Aspects of the disclosure may present determined migration plans to aid in the creation of the new migration plan.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
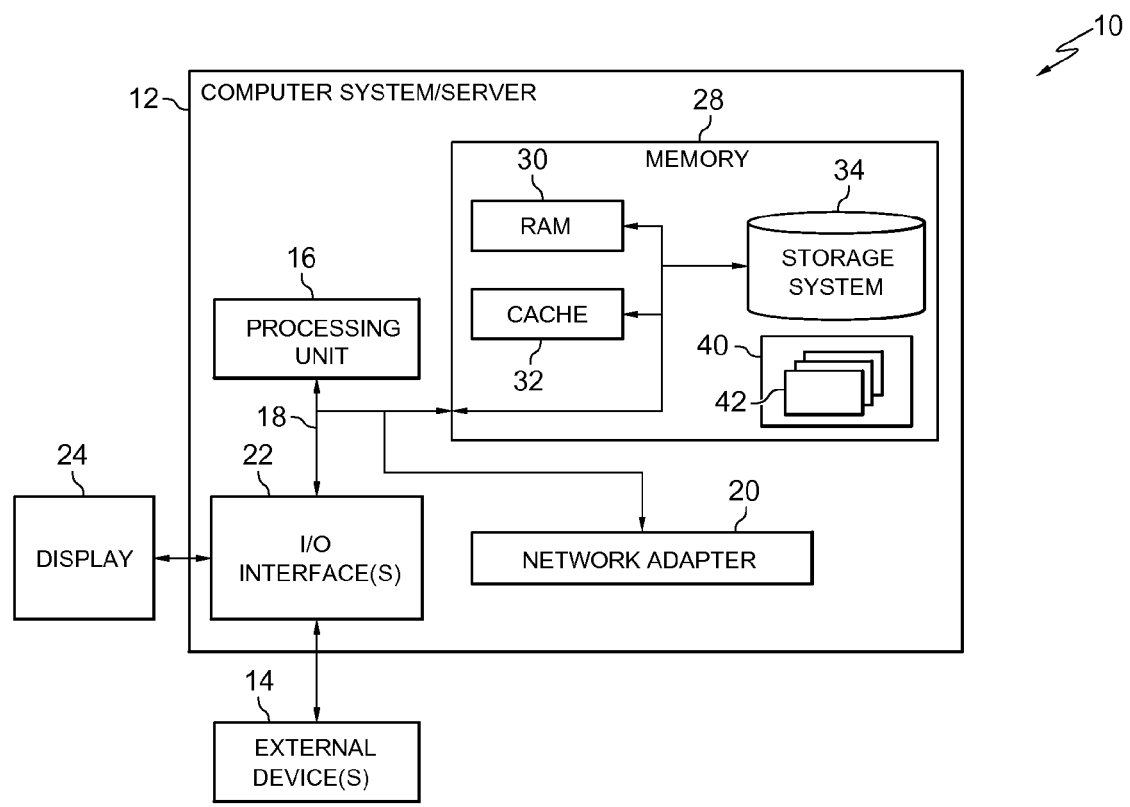
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure can assist in migrating a set of software modules (e.g., applications) to a target computer networking environment from a source computing environment. The source may have attributes including source memory requirements, source disk space requirements, source use definition, and middleware-to-middleware topology. A discovery process may establish a set of attributes (e.g., source features). Aspects of the disclosure may compare the source features and a set of legacy features. The set of legacy features may be associated with a previously migrated application (e.g., legacy application), and in some embodiments can include patterns. Patterns can contain data regarding legacy features and previously migrated applications. The comparison can use a similarity process to identify a legacy application with a cost measure better than a threshold. A distribution function can migrate the application to the target in a manner consistent with the migration of legacy applications.

Aspects of the disclosure may include using a learning process for the comparison. The learning process can include a set of operations. In an embodiment an operation may include capturing a profile of the application. The profile may be a format, such as an n-dimensional feature vector. The disclosure may include a stability operation to determine stability of the post-migration performance of the application. Stability may be related to a specific migration plan, and may help determine the viability of the specific migration plan. The stability may be relative to a post-migration performance of the application related to another specific migration plan. The stability operation may include a series of probabilistic extrapolations of the application to the target to determine a stability score. An embodiment of the disclosure may rank a set of possible target definitions based upon similarity and stability scores. A user may create another target definition from the set of possible target definitions.

Aspects of the disclosure generate a set of migration plans for applications migrating from a source to a target. When source and target resources change, users may redefine how applications are hosted. If source and target resources change frequently, finding migration plans can provide challenges for users. The target may include a specific configuration on a computer networking environment. In some embodiments, the computer networking environment may be a cloud. The source can include a specific computing environment which hosted the application prior to migration. Data from a set of previously migrated applications may be clustered and mined to create a set of migration plans. The set of migration plans may include a set of multi-variable configurations of a set of virtual machines to host the application on the cloud. The set of migration plans can include the configurations employed by the set of previously migrated applications. Aspects of the disclosure may include comparing the application to the set of previously migrated applications to identify migration plans which may be repeatable. Resources of one or more parties may be saved by expediting the migration process while highlighting more efficient options.

Aspects of the disclosure include a computer-implemented method, system, and computer-program product for managing migration of an application from a source computing environment to a target computing environment. The method, system, and computer program product may work on a number of operating systems. Migration management can include a plurality of operations for computer-implementation. A source dataset is established. The source dataset may have a set of source features. The set of source features may include a source. The source can include an individual computer environment which includes the application. Aspects of the disclosure may compare the source dataset and a set of legacy features. Aspects of the disclosure may determine a set of migration plans. The comparison may find a subset of legacy features which passes a similarity threshold using a cost measure. The set of legacy features may include datasets of previously migrated applications. The application may migrate from the source to the target by making use of the set of migration plans.

In embodiments, migration of the application may be requested. Aspects of the disclosure may include a learning process to improve the migration plan determination through additional migration plan determinations. The learning process may include establishing a specifically formatted source dataset for the application. The formatted source dataset may include future performance data and a set of components of the source such as the topology of the source, a number-of-transactions factor of the application, a system-response factor of the application, memory usage of the application, disk usage of the application, network usage of the application, or application central processing unit (CPU) usage. Aspects of the disclosure may include a comparison of the formatted source dataset to a set of similarly formatted source datasets of previously migrated applications. The comparison may use a technique known as a support vector machine (SVM). The comparison may determine a set of migration plans. A user may select migration plans. Embodiments may include the determination employing a cost measure. The cost measure may include a cost of engaging the application, a cost of accessing components leveraged by the application, a speed of the application, or a response time of the application. Alternatively, in an embodiment the user may guide the SVM to create a new migration plan. An embodiment may update the set of similarly formatted source datasets to include the source dataset of the application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
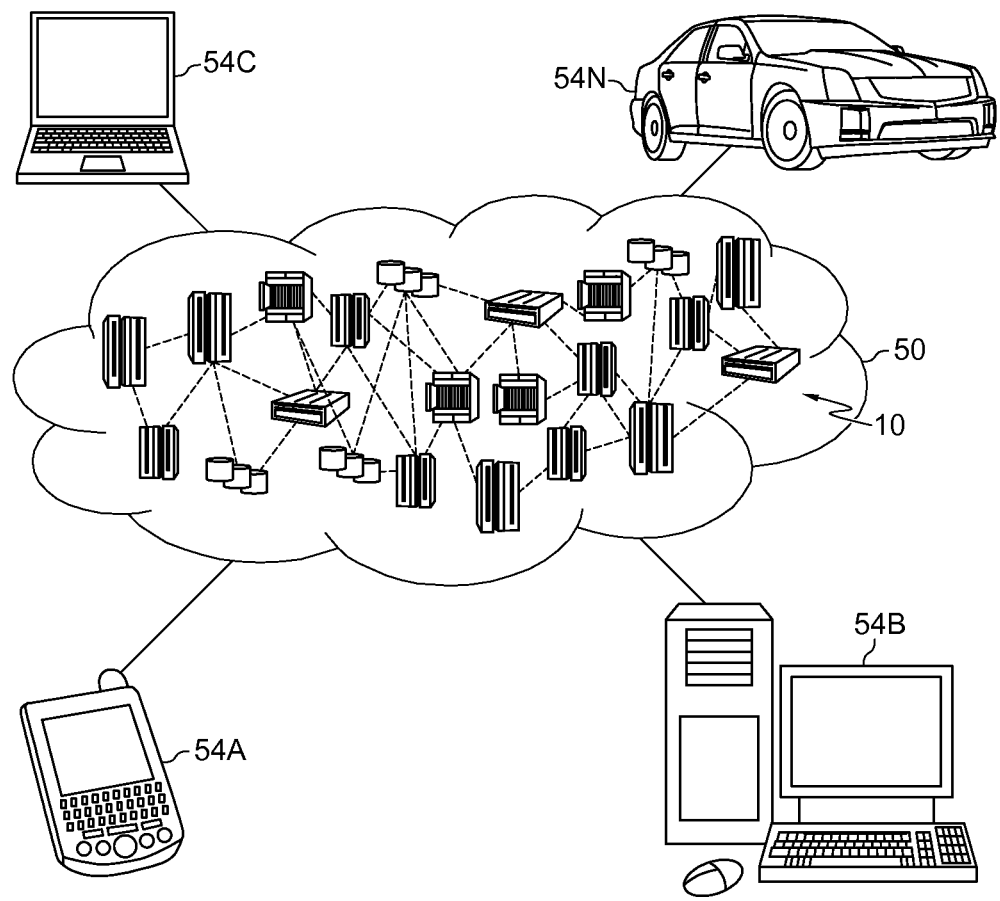
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
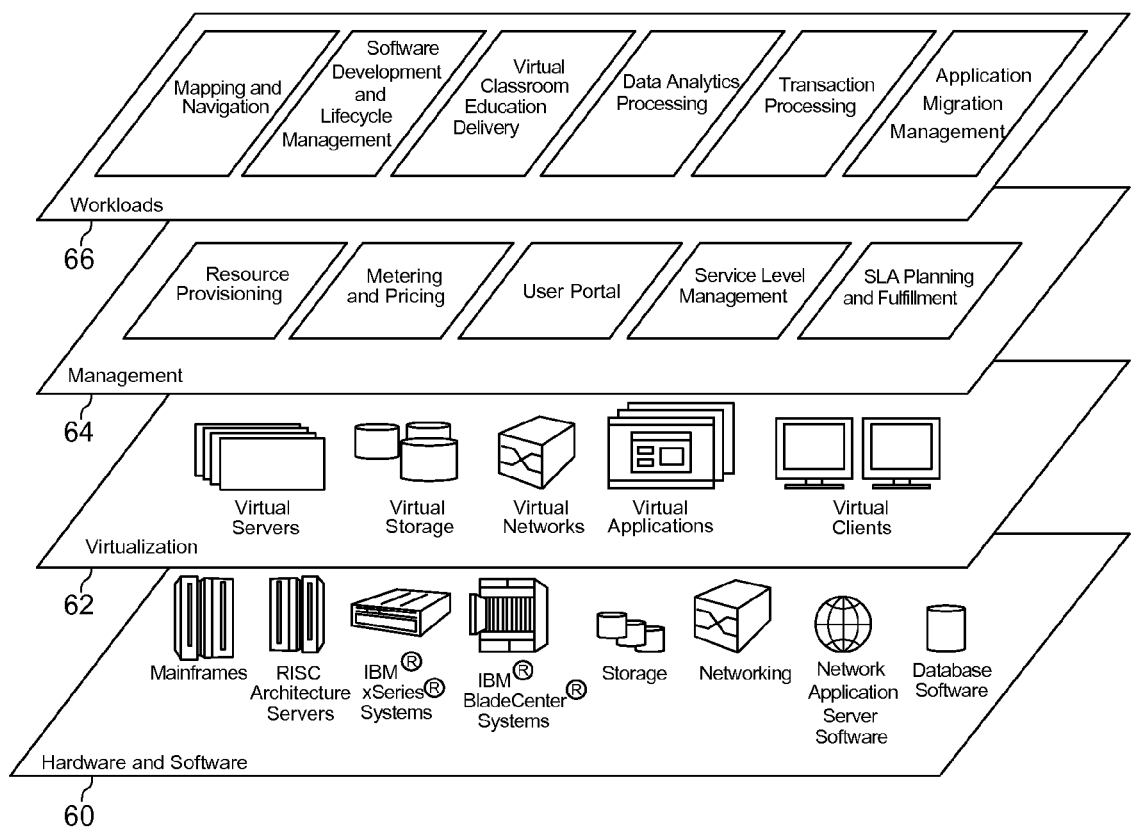
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, Series, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and application migration management. The cloud computing environment may be responsible for triggering applications migration for regular maintenance. Data for migration management may be collected by the cloud computing environment. The cloud computing environment may analyze at least a portion of data collected to manage migration.

Figure 4:
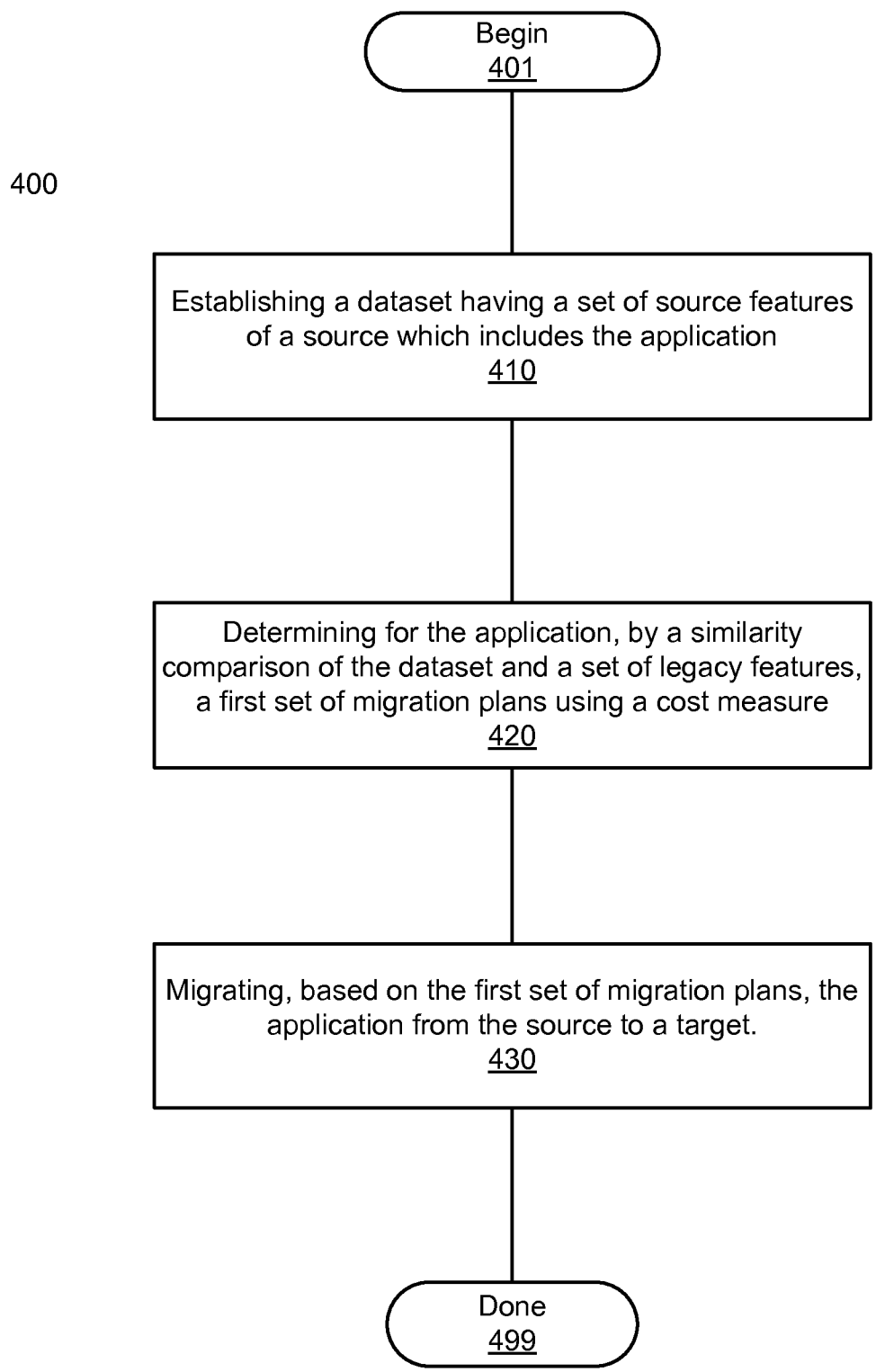
FIG. 4 depicts a method of managing migration of an application according to an embodiment.

FIG. 4 is a flowchart illustrating a method 400 for managing migration of an application from a source to a target. Aspects of method 400 may work on a number of operating systems. The method 400 begins at block 401. The source is the computing environment which hosts the application prior to migration. The target is the computing environment to which the application may be migrated to. In embodiments, the target computing environment is a cloud. Aspects of the method 400 may begin by an end-user requesting migration of the application to the target in the cloud. Alternatively, aspects of the method 400 may begin by a system-user requesting migration of the application to the target in the cloud.

At block 410, a source dataset is established. The source dataset includes a set of source features of a source. The source includes the computer networking environment which hosts the application prior to migration. In an embodiment the source may be a single computational device. The source includes the application to be migrated. The source features may include topology of the source. Topology may be the relationship between at least two features of network architecture. The topology of the source may be configured to describe at least two of a group consisting of a first physical component of the source (e.g., a first rack, switch, router, etc.), a second physical component of the source (e.g., a second rack, switch, router, etc.), a first virtual component of the source (e.g., a first virtual machine), or a second virtual component of the source (e.g., a second virtual machine). The source features may further include a set of components of the source such as a number-of-transactions factor (e.g., calculations in a second, transfers in a day, etc.), a system response factor (e.g., time between call and response), memory usage, disk usage, network usage, and application central processing unit usage.

The source features may be established. In an embodiment, aspects of the method 400 receive a semantic graph of properties and relationships of the source as an input. An end-user may upload characteristics and requirements to establish the source dataset. An embodiment may also allow a system-user to dynamically collect data to establish the source dataset to have positive impacts (e.g., resource such as time or money). For example, a system-user may have a script which the system-user runs upon the method beginning 401. The script may pull data from the source without input from an end-user. Establishing source features without intervention from an end-user may reduce time and a source of error.

Aspects of the method 400 may also identify a smaller number and type of source features required within the source dataset. For example, aspects of the disclosure may query migration plans to determine a threshold number of legacy features used in a successful migration. Aspects of the method 400 may identify the threshold number of legacy features. The method may also identify the type (e.g., a transaction factor, CPU usage, memory usage, etc.) of the threshold number of legacy features. Aspects of the disclosure may then gather the number and type of source features identified in the threshold number when establishing the source dataset. For example, if a previous migration had a set of legacy features consisting of memory usage, disk usage, and a system response factor, aspects of the method 400 may create the source dataset with the same three source features. Finding a smaller number of type of source features required may reduce time and cost by eliminating resources which would gather extraneous source features.

At block 420 a first set of migration plans is determined. The first set of migration plans includes a set of configurations for the application at the target. The target includes a computer networking environment (e.g., a storage area network, a wide area network, a cloud, etc.) which the application may migrate to. The set of configurations includes a set of blades which may host the application, a set of racks which may hold and connect the blades, a set of routers which may allow the application to communicate, a set of switches which manage the data pathways of the application, and a set of virtual machines which the application may reside on. The first set of migration plan may be the set of configurations employed by a previously migrated application.

The source dataset and a set of legacy features may undergo an evaluation. The evaluation may include a similarity comparison. The set of legacy features includes a set of source features of previously migrated applications. The set of previously migrated applications may have been migrated to a different computer networking environment than the computer networking environment the application is being migrated to. The set of legacy features are associated with a set of migration plans. For an example similarity comparison, an example source dataset regarding an application executing 8,000 transactions in a day may have a single virtual machine with three blades in a single rack with a single router and switch handing data flow. An example set of legacy features regarding an application executing 5,000,000 transactions a day may have two virtual machines with 250 blades over ten racks with 2 routers and 3 switches handling data flow. A similarity comparison between the example source dataset and the example set of legacy features may find the two very dissimilar due to the orders of magnitude of difference in features.

The evaluation may determine the first set of migration plans using a cost measure. A cost measure may include a value factor of engaging the application at the target as specified in a migration plan (e.g., a cost of using network memory), a value factor of accessing components leveraged by the application as specified in a migration plan (e.g., a cost of using the racks/routers/switches/etc. allocated by the migration plan), a performance factor of the application as specified in a migration plan (e.g., calculations in a second, transfers in a day), and a response factor of the application as specified in a migration plan (e.g., time between call and response). The performance factor or response factor of a cost measure may be a different value from the performance factor or response factor of the source features. The different value may allow a user to make an application behave differently post-migration. For example, a supply chain management application may have been able to manage the data of 500 warehouses before performance suffered. A user may be able to specify that the supply chain management application be able to manage the data of 1000 warehouses after migration. In this way a user can use aspects of the disclosure to modify application performance.

The similarity comparison may determine which of the set of legacy features meets a similarity threshold to the source dataset while meeting a cost measure threshold. Any of the set of legacy features which meets the similarity threshold and meets the cost measure threshold may have the migration plan associated with that set of legacy features presented to the user. Alternatively, the similarity comparison may present those migration plans which have associated legacy features with higher combined similarity scores and cost measure scores. The presented migration plans may have the similarity and cost measure results displayed to the user.

In an embodiment the evaluation may include a learning algorithm. The learning algorithm may use a technique known as a support vector machine. If the method 400 employs a learning algorithm the source dataset and the set of legacy features may be specifically formatted before the evaluation. The learning algorithm may allow a user to create a new migration plan. The user may create the new migration plan by modifying the set of migration plans presented by aspects of the method 400. The user may alternatively create the new migration plan without input.

At block 430 the application is migrated. The migration may be completed with any migration plan selected or created by a user. The migration may include installing and configuring components in a manner consistent with a chosen migration plan. The migration may include creating or configuring virtual machines in the manner consistent with the chosen migration plan. After migration, the source dataset may be added to the source of legacy features. After migration, any created migration plans may be added to the set of migration plans.

The method of FIG. 4 may be embodied in multiple ways. An embodiment may have an end-user request a migration to bring an application from a first cloud to a second cloud. Aspects of the disclosure may collect a source dataset regarding how the application was configured at the first cloud. The source dataset may include the physical components which supported the application, the virtual machines which utilizes the physical components, the performance of the application on the first cloud, and the required performance of the application on the second cloud.

Aspects of the disclosure may compare the source dataset to sets of data from applications which have been migrated previously. The comparison may use cost measure thresholds of the application. The comparison may find which sets of data have higher correlations and greater chances of meeting the cost measures of the application. Aspects of the disclosure may find how those previously migrated applications, which had sets of data with suitable correlation and cost measure threshold satisfaction, were migrated. The application may then be migrated in the same manner or in substantially the same manner as the previously migrated applications.

For example, aspects of the disclosure may compare a set of source features of a first accounting application to be migrated to a first cloud to a second, third, and fourth set of legacy features of a second, third, and fourth accounting application which were migrated to the first cloud, a second cloud, and a third cloud, respectively. The second set of legacy features may have a high correlation with the source features but a poor chance of meeting the cost measure thresholds of the first accounting application. The third set of legacy features may have had a poor correlation with the source features but a high chance of meeting the cost measure thresholds of the first accounting application. The fourth set of legacy features may have both a high correlation with the source features and a high chance of meeting the cost measure thresholds of the first accounting application. Therefore, the fourth legacy set may be selected. Aspects of the disclosure may discover how the fourth accounting application was migrated. The first accounting application may then be migrated by a migration plan consistent with how the fourth accounting application was migrated.

Figure 5:
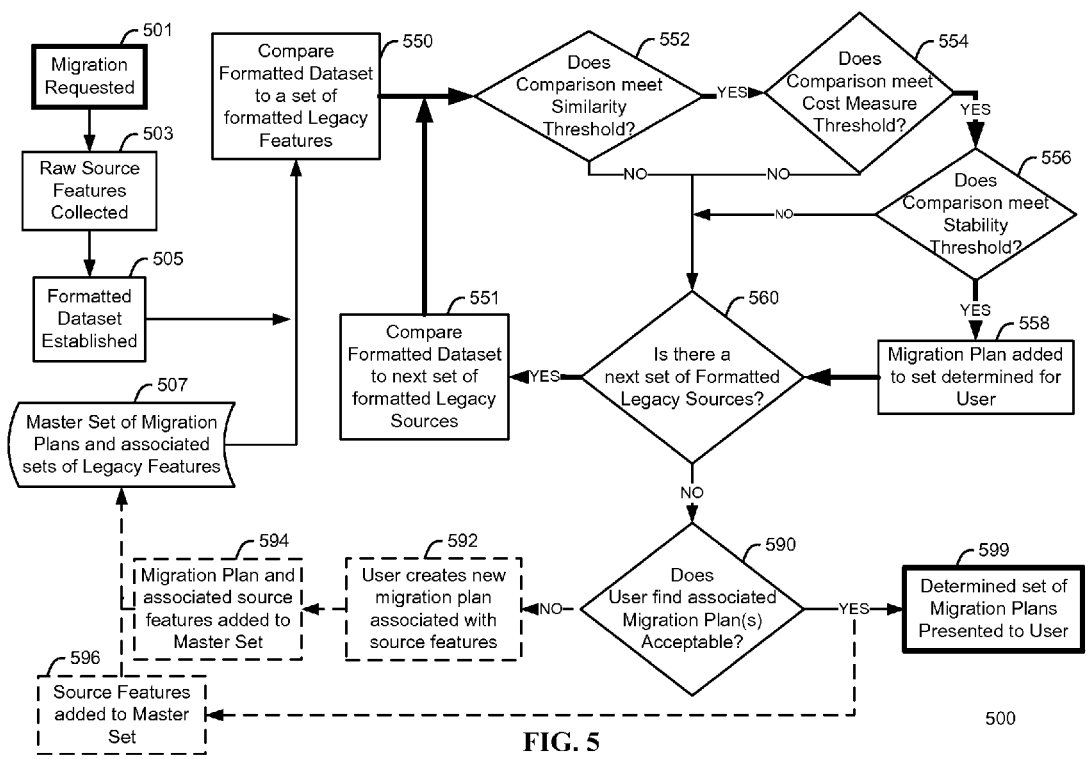
FIG. 5 depicts a flowchart of managing migration of an application according to an embodiment.

FIG. 5 shows an embodiment of a method 500 for determining a migration plan. The method 500 may start with a migration request 501 which triggers a script for collecting a source dataset of source features 503. The formatted source dataset of source features may be established 505. In an embodiment, the source dataset would be formatted into a source feature vector. The source feature vector may be n-dimensional. Aspects of the method 500 may pull in a master set 507 of data which includes a set of migration plans and an associated set of legacy features. The associated set of legacy features may be formatted into a set of feature vectors. The set of legacy feature vectors may include legacy feature vectors which are n-dimensional.

Aspects of the embodiment may include a first comparison 550 between the source feature vector and a legacy feature vector. The method 500 may begin with the first comparison 550 and may continue with iterative comparisons 551 until the sets of feature vectors pulled from the master set 507 have been compared. In FIG. 5 the iterative cycle is illustrated by the arrows in bold. The first comparison may include a set of operations. The set of operations may include a similarity test 552, a cost measure test 554, a stability test 556, a source dataset determination step 558, and a test for more legacy feature vectors within the set of feature vectors 560.

In method 500 one operation is the similarity test 552 between the legacy feature vector and the source feature vector. The similarity test 552 may check if the comparison between the legacy feature vector and the source feature vector meets a threshold number of equivalent or nearly-equivalent features. For example, the source feature vector may have a number of blades serving the application. The legacy feature vector may have a same number of blades serving a legacy application. The same number may count as one equivalent feature, raising the similarity score and making it more likely to meet the threshold number. However, the example the source feature vector may have a different application CPU speed than the legacy feature vector. The different application CPU speed may count as a non-equivalent feature. The non-equivalent feature may lower the similarity score and make the similarity test 552 less likely to meet the threshold number. Once a similarity score is developed, the test may conclude with a pass (yes) or a fail (no), depending upon if the similarity score meets or fails to meet the similarity threshold, respectively.

The similarity test 552 may be evaluated in a number of ways. In an embodiment, aspects of the method 500 may format the source feature vector as $X=\{X1, X2, X3, \ldots Xi, \ldots Xn\}$, where i represents the ith feature. The method may also have the legacy feature vector as $T=\{T1, T2, T3, \ldots Ti, \ldots Tn\}$. In the embodiment the similarity score may be the accumulated deviation from the two feature vectors over normalized features. The accumulated deviation may be calculated as: $D(X,T)=\Sigma_i((x_i,T_i)/\sigma_i)$, where $\sigma$ is a weighting coefficient. The result of the equation may calculate the similarity of any source feature vector.

Another test is the cost measure test 554. Aspects of the method 500 may utilize the cost measure test 554 if the similarity score passes. The cost measure test 554 may check if the comparison between the source feature vector and the legacy feature vector meets a threshold number of equivalent or nearly equivalent cost-measure aspects. For an example, a source feature vector may have a cost measure that the application exceed a certain amount of transactions in an hour and the legacy feature vector has a same legacy cost measure. The same legacy cost measure may count as a one equivalent feature. The one equivalent feature may raise the cost measure score of the set of formatted legacy features. The raised cost measure score may make it more likely that the cost measure test may meet the threshold number. However, if the source feature vector has a different required cost for accessing components at a target than the legacy feature vector, the difference may count as a non-equivalent cost-measure. The non-equivalent cost-measure may lower the cost measure score and make it less likely to meet the threshold number. The step may conclude with either a cost measure score which passes (yes) or fails (no) the cost measure threshold.

The method may test for stability. The stability test 556 may entail the aspects of the disclosure verifying if the migration plan associated with the legacy feature vector remains stable over numerous extrapolations. Aspects of the method 500 may test the set of legacy feature vector with the stability test 556 if the cost measure score passes. The stability test 556 may include verifying that the migration plan meets a stability threshold difference. The stability test 556 may include a set of probabilistic extrapolations of the source feature vector onto the target as specified in the migration plan. The set of probabilistic extrapolations may illuminate performance of the application at the target. If the variance of the performance meets a threshold difference of equivalent or nearly equivalent performances the stability test 556 may register as a success. For an example, perhaps a first extrapolation shows that the application executes 4,000 transactions in an hour and the second extrapolation shows that the application executes 4,150 transactions in an hour. If the threshold difference is 300 transactions in an hour, the 150 transactions in an hour difference between the first and second extrapolation may count as one equivalent extrapolation, raising the stability score. However, the example may also have a first extrapolation with a cost of $300 a month for network usage at a target and a second extrapolation with a cost of $180 a month for network usage at a target. If the threshold difference is $50, the $120 difference between the first extrapolation and the second extrapolation may count as a non-equivalent extrapolation, lowering the stability score and making it less likely to meet the threshold difference. The step may conclude with either a stability score which passes (yes) or fails (no) the stability threshold difference.

If the legacy feature vector has passed all three tests, an associated migration plan is determined as suitable for presentation to the user. The associated migration plan is put into a final set of migration plans for presentation to the user 558. The final set of migration plans may have a final comparison score. The final comparisons score may include a composite score from the three tests to give the user an idea of how the associated migration plan fared throughout tests.

Aspects of the method 500 may test for another legacy feature vector 560 from the set of legacy feature vectors. Aspects of the method 500 may test for a next legacy feature vector regardless of the result of previous tests. If one or more of the comparison test 552, cost measure test 554, or stability test 556 return failures, the logic of the method 500 may skip other tests and conduct the test for a next legacy feature vector 560. The method may check to see if all legacy feature vectors pulled from the set of legacy feature vectors have been compared to the source feature vector. If there is another legacy feature vector, the test passes (yes). If all legacy feature vectors have been compared to the source feature vector, the test returns a negative (no). If the test passes the next legacy feature vector can be compared to the source feature vector 551 and the operations in the iterative comparison may restart.

Once block 560 returns no, the iterative cycle of the method 500 has ended. Aspects of the method 500 may gather the final set of migration plans. Aspects of the method 500 may then test the final set of migration plans with an acceptability test 590. The acceptability test may include a user check of the migration plan associated with the "passing" set of formatted legacy features. If the user finds the migration plan acceptable, the user may pass (yes) the migration plan. If the user finds the migration plan unacceptable, the user may fail (no) the migration plan.

Any migration plans which have passed may be presented to the user 599 as the determined migration plans. If no migration plans have passed, aspects of the disclosure may allow a user to create a new migration plan 592. In various embodiments, the user must be a qualified user to create the new migration plan. In various embodiments, migration plans from the master set 507 may be presented for modification to assist in creating the new migration plan. The created migration plans may then be used by the user in migrating the application.

Aspects of the method 500 may collect data regarding the source features and final migration plan for the master set 507. If a new migration plan was created, the collected data may include both the new migration plan and the source feature vector 594. If there was not a new migration plan created, the source feature vector would be collected 596 and associated with the chosen migration plan. The master set 507 would be updated with the chosen migration plan and source feature vector. The update may allow aspects of the disclosure to become better at determining migration plans with each determination.

The blocks in the method 500 are presented as they are to demonstrate an embodiment of aspects of the disclosure. Many of the blocks may be rearranged and still be encompassed within the disclosure. The tests within the loop specifically may occur in any order. Alternatively, some or all of the tests may occur simultaneously. The tests do not need to happen in the order detailed in method 500.

Figure 6:
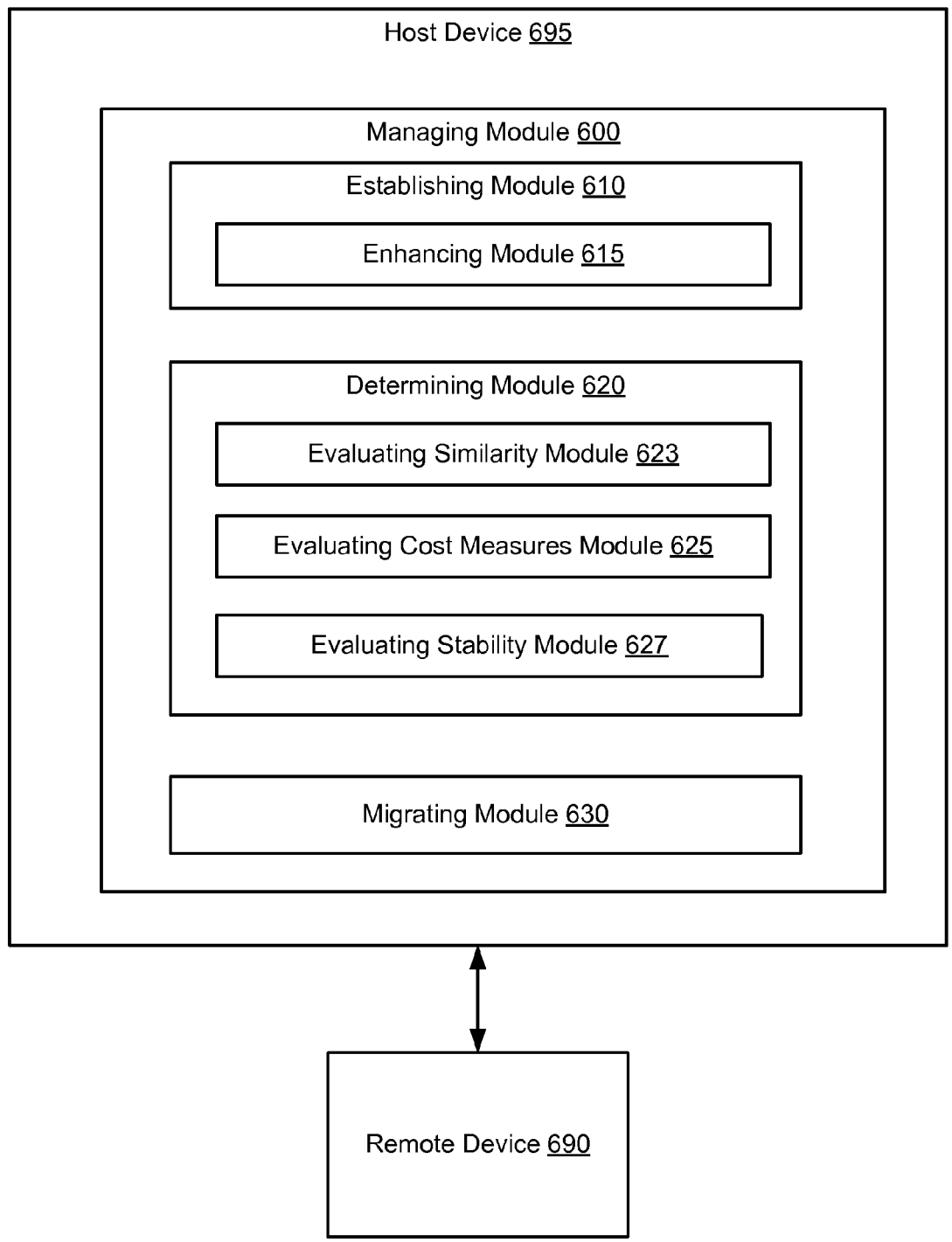
FIG. 6 depicts a system of managing migration of an application according to an embodiment.

FIG. 6 shows embodiments of a system for managing migration of an application from a source to a target. In embodiments, method 400 may be implemented using one or more modules of FIG. 6. These modules may be implemented in hardware, software, or firmware executable on hardware, or a combination thereof. For example, module functionality that may occur work on a host device 695 may actually be implemented in a remote device 690 and vice versa. Other functionality may be distributed across the host device 695 and the remote device 690.

The host device 695 may include a managing module 600. The managing module may be configured and arranged to manage migrations of applications. The managing module may include an establishing module 610, a determining module 620, and a migration module 630. The establishing module 610 may include an enhancing module 615. The determining module 620 may include an evaluating similarity module 623, an evaluating cost measures module 625, and an evaluating stability module 627.

The establishing module 610 establishes a source dataset. The source dataset includes a set of source features of a source. The source includes the computer networking environment which hosts the application prior to migration. The source includes the application to be migrated. The source features may include topology of the source. The establishing module 610 may download data for the source dataset or allow upload of data for the source dataset.

The establishing module 610 may include an enhancing module 615 for improving the process of establishing the source dataset. The enhancing module 615 may dynamically collect data to establish the source dataset by running scripts to save time and money. The scripts may pull data from the source. The enhancing module 615 may identify a smaller number of source features of a source dataset. To establish the smaller number of source features, the enhancing module 615 may identify a threshold number of an identified type of source features. The enhancing module 615 may determine the threshold number to be the number of legacy features of previously migrated applications.

The determining module 620 may determine a first set of migration plans. The first set of migration plans may govern how the application may be hosted after migration. The determining module 620 may determine the first set of migration plans with an evaluation. The evaluation may be of the source dataset and a set of legacy features.

The determining module 620 may include an evaluating similarity module 623. The evaluating similarity module 623 may evaluate the similarity between the set of source features and the set of legacy features. The evaluating similarity module 623 may determine if the set of legacy features meets a similarity threshold to the set of source features. If the set of legacy features meets the similarity threshold, the evaluating similarity module 623 may identify a migration plan associated with the set of legacy features for the determining module 620. The determining module 620 may then determine the migration plan for the user.

The determining module 620 may include an evaluating cost measures module 625. The evaluating cost measures module 625 may evaluate the set of legacy features using a cost measure. The evaluating cost measures module 625 may determine if the set of legacy features meets a cost measure threshold. If the set of legacy features meets the cost measures threshold, the evaluating cost measures module 625 may identify a migration plan associated with the set of legacy features for the determining module 620. The determining module 620 may then determine the migration plan for the user.

The determining module 620 may include an evaluating stability module 627. The evaluating stability module 627 may evaluate a projected stability of application performance at the target per a migration plan. The evaluating stability module 627 may determine projected stability by extrapolating performance of the application at the target with numerous probabilistic predictions. The numerous probabilistic predictions may determine the range of performances of the application at the target. The projected stability may be better with a smaller range of performances. The evaluating stability module 627 may determine if the projected stability meets a stability threshold. If the projected stability meets the stability threshold, the evaluating stability module 627 may identify the migration plan associated with the projected stability for the determining module 620. The determining module 620 may then determine the migration plan for the user.

The determining module 620 may determine which of the set of legacy features meets both a similarity threshold and a cost measure threshold while the associated projected stability meets a stability threshold. Any of the set of legacy features which meets the similarity threshold, cost measure threshold, and stability threshold may have the migration plan associated with that set of legacy features presented to the user. Alternatively, the determining module 620 may identify a set of migration plans which have associated legacy features with better similarity scores, better cost measure scores, and better stability scores. The determining module 620 may present the identified set of migration plans to the user. The determining module 620 may also present the similarity scores, cost measures scores, and stability scores of the set of migration plans which was identified to the user. The determining module 620 may allow the user to craft a new migration plan using the identified set of migration plans. The determining module 620 may alternatively allow the user to craft a new migration without input.

The migrating module 630 migrates the application. The migrating module may migrate the application with any migration plan determined by the determining module 620. The migrating module 630 may install components in a manner consistent with the chosen migration plan. The migrating module 630 may create or configure virtual machines in a manner consistent with the chosen migration plan. After migration, the migrating module 630 may add the source dataset to the source of legacy features. After migration, the migrating module 630 may add any created migration plans to the set of migration plans. The adding of any created migration plans to the set of migration plans may make aspects of the disclosure more likely to determine an appropriate migration plan in future determinations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing migration of an application, the method comprising:
    receiving, by a processor, a request to migrate the application;
    establishing, upon receiving the request, a source dataset having a set of source features of a source which includes the application, wherein the set of source features includes a source topology of the application configured to describe at least two features selected from a first physical component of the source, a second physical component of the source, a first virtual component of the source, and a second virtual component of the source;
    obtaining a set of legacy features of the application or a previously migrated application;
    determining, for the application, a first set of migration plans using a cost measure by evaluating the source dataset and the set of legacy features; and
    migrating, based on the first set of migration plans, the application from the source to a target.

2. The method of claim 1, further comprising:
    establishing a set of post-migration performance data of the application;
    determining a second set of migration plans using the set of post-migration performance data; and
    establishing an updated set of legacy features including the set of source features of the source.

3. The method of claim 1, wherein:
    the source includes a computer networking environment configured to transport the application;
    the target includes a computer networking environment configured to receive the application;
    the set of source features includes a set of components of the application at the source having a number-of-transactions factor, a system response factor, memory usage, disk usage, network usage, and application central processing unit usage;
    the set of legacy features includes a set of source features of previously migrated applications.

4. The method of claim 1, wherein the cost measure includes at least one feature selected from:
    a value factor of engaging the application per a migration plan,
    a value factor of accessing components leveraged by the application per a migration plan;
    a performance factor of the application per a migration plan, and
    a response factor of the application per a migration plan.

5. The method of claim 1, wherein the evaluating includes:
    establishing the source dataset as a first n-dimensional feature vector and the set of legacy features as a set of n-dimensional feature vectors;
    determining, based on the first n-dimensional feature vector and the set of n-dimensional feature vectors, a set of similarity scores associated with each of the set of n-dimensional feature vectors; and
    processing, in response to one or more of the set of n-dimensional feature vectors associated with a first set of migration plans meeting a similarity score threshold, the first set of migration plans.

6. The method of claim 1, wherein the first set of migration plans includes a set of configurations of the application at the target used by a previously migrated application, the set of configurations having:
    a set of racks configured for application hosting;
    a set of routers configured for application communicating;
    a set of switches configured for application connection managing; and
    a set of virtual machines configured for application organization.

7. The method of claim 1, wherein the first set of migration plans includes:
    a legacy target of the previously migrated application in a first computer networking environment;
    the target of the application in a second computer networking environment; and
    a configuration applicable to the first computer networking environment, the second computer networking environment, and a third computer networking environment.

8. The method of claim 1, wherein establishing the source dataset includes collecting data via scripts executed by a scripting engine to gather a set of inputs.

9. The method of claim 1, further comprising:
    identifying, using previous migrations, a threshold number of source features used in a successful migration;
    determining another set of source features including the threshold number of source features used in the successful migration; and
    establishing a source dataset using the set of source features.

10. The method of claim 1, wherein determining the first set of migration plans includes using a support vector machine.

11. The method of claim 2, wherein establishing the set of post-migration performance data of the application further comprises:
  collecting a set of performance data of the application; and
  predicting a set of post-migration performance data of the application.

12. A system for managing migration of an application, the system comprising:
  a remote device; and
  a host device, at least one device of the remote device and the host device including a processor configured to perform a method comprising:
  receiving a request to migrate the application;
  establishing, upon receiving the request, a source dataset having a set of source features of a source which includes the application, wherein the set of source features includes a source topology of the application configured to describe at least two features selected from a first physical component of the source, a second physical component of the source, a first virtual component of the source, and a second virtual component of the source;
  obtaining a set of legacy features of the application or a previously migrated application;
  determining, for the application, a first set of migration plans using a cost measure by evaluating the source dataset and the set of legacy features; and
  migrating, based on the first set of migration plans, the application from the source to a target.

13. The system of claim 12, wherein:
  the source includes a computer networking environment configured to transport the application;
  the target includes a computer networking environment configured to receive the application;
  the set of source features includes a set of components of the application at the source having a number-of-transactions factor, a system response factor, memory usage, disk usage, network usage, and application central processing unit usage;
  the set of legacy features includes a set of source features of previously migrated applications; and
  the first set of migration plans includes a set of configurations of the application at the target used by a previously migrated application, the set of configurations having:
  a set of racks configured for application hosting;
  a set of routers configured for application communicating;
  a set of switches configured for application connection managing; and
  a set of virtual machines configured for application organization.

14. The system of claim 12, wherein the processor is further configured to structure the source dataset using:
  scripts to gather a set of inputs; and
  a threshold number of source features used in a successful migration.

15. The system of claim 12, wherein the method performed by the processor further comprises identifying a group of the set of legacy features, wherein the group of the set of legacy features has a similarity score meeting a similarity threshold to the source dataset.

16. The system of claim 12, wherein the method performed by the processor further comprises identifying a portion of the set of legacy features, wherein the portion of the set of legacy features has a cost measure score meeting a cost measure threshold of the source dataset.

17. The system of claim 12, wherein the method performed by the processor further comprises identifying a migration plan, wherein the migration plan has a set of stability scores of a set of probabilistic extrapolations of the application to the target within a stability threshold.

18. A computer program product for managing migration of an application, the computer program product disposed upon a computer readable storage medium, wherein the computer readable storage medium is not a transitory signal per se, the computer program product comprising computer program instructions that, when executed by a computer processor of a computer, cause the computer to carry out the steps of:
  receive a request to migrate the application;
  establish, upon receiving the request, a source dataset having a set of source features of a source which includes the application, wherein the set of source features includes a source topology of the application configured to describe at least two features selected from a first physical component of the source, a second physical component of the source, a first virtual component of the source, and a second virtual component of the source;
  obtain a set of legacy features of the application or a previously migrated application;
  determine, for the application, a first set of migration plans using a cost measure by evaluating the source dataset and the set of legacy features; and
  migrate, based on the first set of migration plans, the application from the source to a target.

* * * * *